United States Patent
Goldsmith et al.

(10) Patent No.: US 10,195,673 B2
(45) Date of Patent: Feb. 5, 2019

(54) CERAMIC CUTTING INSERT AND METHOD OF MAKING SAME

(71) Applicant: Kennametal Inc., Latrobe, PA (US)

(72) Inventors: Jason Won Goldsmith, Greensburg, PA (US); Kent Peter Mizgalski, Stahlstown, PA (US); Brad Daniel Hoffer, White, PA (US); Lance David Brunetto, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 335 days.

(21) Appl. No.: 14/965,952

(22) Filed: Dec. 11, 2015

(65) Prior Publication Data
US 2017/0165757 A1    Jun. 15, 2017

(51) Int. Cl.
*B32B 27/22*    (2006.01)
*B23B 27/14*    (2006.01)
(Continued)

(52) U.S. Cl.
CPC .......... *B23B 27/145* (2013.01); *B23B 27/143* (2013.01); *B23P 15/28* (2013.01); *B23P 15/30* (2013.01); *B24B 3/34* (2013.01); *B23B 2200/0461* (2013.01); *B23B 2200/0471* (2013.01); *B23B 2200/087* (2013.01);
(Continued)

(58) Field of Classification Search
CPC ...... B23B 2200/242; B23B 2200/3663; B23B 27/143; B23B 27/145; B23B 2200/0461; B23B 2200/0471; B23B 2200/087; B23B 2200/328; B23P 15/28; B23P 15/30; B24B 3/34
See application file for complete search history.

(56) References Cited

U.S. PATENT DOCUMENTS 3,381,349 A * 5/1968 Newcomer ......... B23B 27/1618
407/101
3,395,434 A * 8/1968 Wirfelt ................. B23B 27/143
407/114
(Continued)

FOREIGN PATENT DOCUMENTS

CN    107030303 A    8/2017
DE    4119878 A1    12/1992
(Continued)

OTHER PUBLICATIONS

Stephenson et al., Metal Cutting Theory and Practice 2nd Ed., CRC Press 2006, pp. 582-587.

*Primary Examiner* — Sara Addisu
(74) *Attorney, Agent, or Firm* — Larry R. Meenan

(57) ABSTRACT

A cutting insert includes a body made of a ceramic material. The body has a first surface, a second surface and at least one flank surface extending between the first surface and the second surface. The first surface includes a chip forming feature extending in a radially outwardly direction to a cutting edge and extending in a radially inwardly direction to an inner edge. The chip forming feature includes a front wall that slopes downward from the cutting edge radially inward toward a rounded bottom surface and a back wall that slopes upward from the rounded bottom surface radially inward to the inner edge. The chip forming feature can include an optional land surface between the cutting edge and the front wall.

15 Claims, 5 Drawing Sheets

(51) Int. Cl.
*B23P 15/30* (2006.01)
*B24B 3/34* (2006.01)
*B23P 15/28* (2006.01)

(52) U.S. Cl.
CPC ... *B23B 2200/242* (2013.01); *B23B 2200/328* (2013.01); *B23B 2200/3663* (2013.01); *B23B 2226/18* (2013.01)

(56) References Cited

U.S. PATENT DOCUMENTS

| | | | | |
|---|---|---|---|---|
| 3,792,514 | A * | 2/1974 | Ushijima | B23B 27/143 407/113 |
| 3,866,282 | A * | 2/1975 | Lundgren | B23B 27/143 407/113 |
| 3,882,580 | A * | 5/1975 | Lundgren | B23B 27/143 407/113 |
| 3,947,937 | A * | 4/1976 | Hertel | B23B 27/143 407/114 |
| 4,124,326 | A * | 11/1978 | Cost | B23B 27/141 407/114 |
| 4,214,846 | A * | 7/1980 | Kraemer | B23B 27/1625 407/114 |
| 4,312,250 | A * | 1/1982 | Yankoff | B23B 27/143 407/114 |
| 4,318,318 | A * | 3/1982 | Schott | B23B 27/143 407/113 |
| 4,616,963 | A * | 10/1986 | Habert | B23B 27/22 407/114 |
| 4,629,373 | A | 12/1986 | Hall | |
| 4,941,780 | A * | 7/1990 | Takahashi | B23B 27/143 407/114 |
| 5,000,626 | A * | 3/1991 | Bernadic | B23B 27/143 407/114 |
| 5,141,367 | A | 8/1992 | Beeghly et al. | |
| 5,324,144 | A * | 6/1994 | Katbi | B23B 27/143 407/114 |
| 5,947,651 | A * | 9/1999 | Murakami | B23B 27/143 407/114 |
| 6,634,837 | B1 | 10/2003 | Anderson | |
| 6,712,564 | B1 | 3/2004 | Hughes et al. | |
| 6,964,933 | B2 | 11/2005 | Yeckley | |
| 7,049,256 | B2 | 5/2006 | Yeckley | |
| 7,094,717 | B2 | 8/2006 | Yeckley | |
| 7,234,901 | B2 * | 6/2007 | Ishida | B23B 27/141 407/114 |
| 7,309,673 | B2 | 12/2007 | Yeckley | |
| 7,458,753 | B1 * | 12/2008 | Niebauer | B23B 27/143 407/113 |
| 8,388,274 | B2 * | 3/2013 | Chen | B23B 27/143 407/113 |
| 2011/0070039 | A1 * | 3/2011 | Park | B23B 27/141 407/113 |
| 2012/0087751 | A1 * | 4/2012 | Yamaguchi | B23B 27/143 407/115 |
| 2013/0094914 | A1 * | 4/2013 | Majima | B23B 27/143 407/114 |
| 2016/0214180 | A1 * | 7/2016 | Sasaki | B23B 27/141 |
| 2016/0339524 | A1 * | 11/2016 | Yamaguchi | B23B 27/143 |
| 2017/0165757 | A1 * | 6/2017 | Goldsmith | B23B 27/145 |

FOREIGN PATENT DOCUMENTS

| | | | |
|---|---|---|---|
| DE | 102016123546 A1 | 6/2017 | |
| EP | 1023961 A1 | 8/2000 | |
| JP | WO 2015083716 A1 * | 6/2015 | ........... B23B 27/141 |

* cited by examiner

CERAMIC CUTTING INSERT AND METHOD OF MAKING SAME

BACKGROUND OF THE INVENTION

The invention relates generally to relates to ceramic cutting tools having an integral chip control surface thereon, and in particular to those ceramic cutting tools of the indexable type which are useful in the high speed machining of metallic materials.

Although ceramic cutting tools have demonstrated significant speed and/or tool life advantages in machining ferrous and non-ferrous materials in relation to cemented carbide, coated cemented carbide and cermet cutting tools in a number of applications, their usefulness remains limited by the commercial unavailability of inserts with positive rake molded chip control designs. Despite references to these designs in the literature, it is generally believed by those of ordinary skill in the art that such molded chip control designs in ceramic inserts will cause premature failure of the cutting edge during cutting operations. This belief is based on the lower transverse rupture strength and fracture toughness of ceramic cutting tool materials compared with cemented carbide and cermet cutting tools.

Compounds have been added to ceramics to increase their fracture toughness and transverse rupture strength. Such compounds, as silicon carbide whiskers, and titanium carbide, $Yb_2O_3$, $La_2O_3$, and other rare earth oxides generally make the resulting composite more difficult to fabricate, insofar as a higher sintering temperature or hot pressing is required to achieve the full density needed to obtain the maximum fracture toughness and transverse rupture strength. It should be noted that, even when fully dense, the fracture toughness and transverse rupture strength of these ceramic composites are still well below those of cermets and cemented carbides.

These higher fabrication temperatures also lead to increased formation of a reaction layer at the surface of the ceramic composite. These reaction layers have a toughness and transverse rupture strength which is lower than that of the bulk material. Thus, in areas where it is critical to cutting performance that these surfaces have optimum strength and fracture toughness, these reaction layers have been ground off. These grinding requirements, therefore, make the fabrication of ceramic cutting inserts with chip control structures expensive and, where complex chip control structures are required, commercially impractical.

However, in most cases, in order to commercially and practically apply ceramic cutting inserts to the automatic (i.e., unmanned) high speed machining of ductile materials, such as soft carbon, alloy and stainless steels and ductile or malleable cast irons, which have a tendency to form undesirably long chips during high speed machining, some form of chip control is needed to provide the desired short chips.

In the past, a separate, non-integral chip breaker was clamped to the flat top rake face of ceramic inserts to provide a degree of chip control, where necessary. Another attempted solution in the prior art was to provide in the top rake surface of the ceramic insert an integral rising chip breaker structure (i.e., a shelf type chip breaker).

In one prior art ceramic cutting insert, a bevel (T-land or K-land) is provided on the rake face adjacent the cutting edge. An island is provided on the rake face having a molded concave wall rising from and above the bevel. Both the bevel and flank face are in a ground condition. The advantage of this design is that it retains the strong cutting edge (i.e., the included angle formed by the bevel and the flank face at the cutting edge is greater than 90 degrees) of the ceramic inserts with a flat rake face, while in some limited conditions providing chip control. Unfortunately, this design and the separate top clamp design tend to crowd, or impede the flow of, the chip as it is formed, and it is thereby believed to increase the power required to cut while also increasing the stresses applied by the chip at or near the cutting edge, leading to reduced cutting edge lifetime.

SUMMARY OF THE INVENTION

There has long been a need in the art for ceramic cutting inserts having a chip control structure, preferably in a positive rake design, and which can be economically and readily manufactured, while providing chip control and acceptable metal cutting lifetimes at high metal cutting speeds over a range of feeds and depths of cut. Therefore, the present invention has been developed in view of the foregoing.

In one aspect of the invention, a cutting insert comprises a body made of a ceramic material. The body has a first surface, a second surface and at least one flank surface extending between the first surface and the second surface. The first surface includes a chip forming feature extending in a radially outwardly direction to a cutting edge and extending in a radially inwardly direction to an inner edge. The chip forming feature includes a front wall that slopes downward from the cutting edge radially inward toward a rounded bottom surface, and a back wall that slopes upward from the rounded bottom surface radially inward to the inner edge.

In another aspect of the invention, a cutting insert comprises a body made of a ceramic material. The body has a first surface, a second surface and at least one flank surface extending between the first surface and the second surface. The first surface includes a chip forming feature extending in a radially outwardly direction to a cutting edge and extending in a radially inwardly direction to an inner edge. The chip forming feature includes a land surface extending between the cutting edge and a front wall that slopes downward from a land surface radially inward toward a rounded bottom surface, and a back wall that slopes upward from the rounded bottom surface radially inward to the inner edge.

In yet another aspect of the invention, a method of making a ceramic cutting insert comprises:
  pressing a blank made of ceramic material into a desired shape, the blank including a chip forming feature on one of a first surface and a second surface;
  sintering the blank to produce a body of a cutting insert;
  grinding the cutting insert to within a dimensional tolerance of about 0.005 inches (0.127 mm); and
  performing a finishing operation on the cutting insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
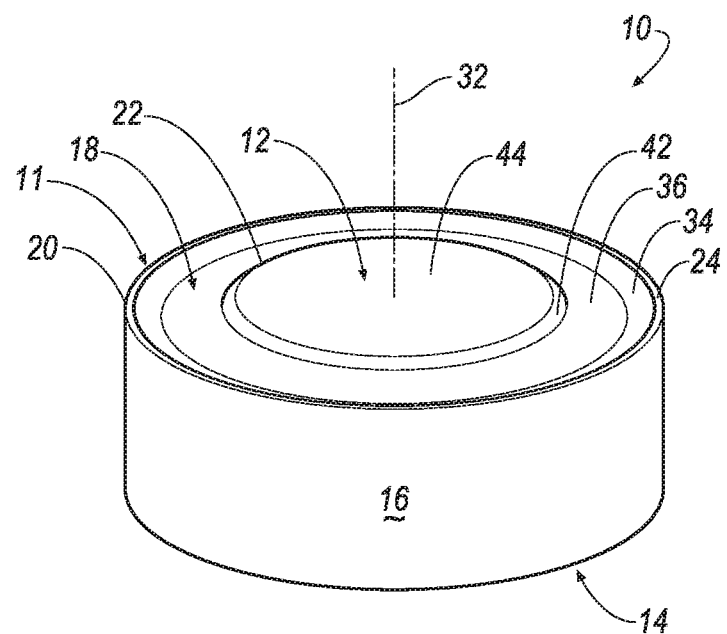
FIG. 1 is a perspective view of a round ceramic cutting insert with a chip forming feature according to an aspect of the invention.
Figure 2:
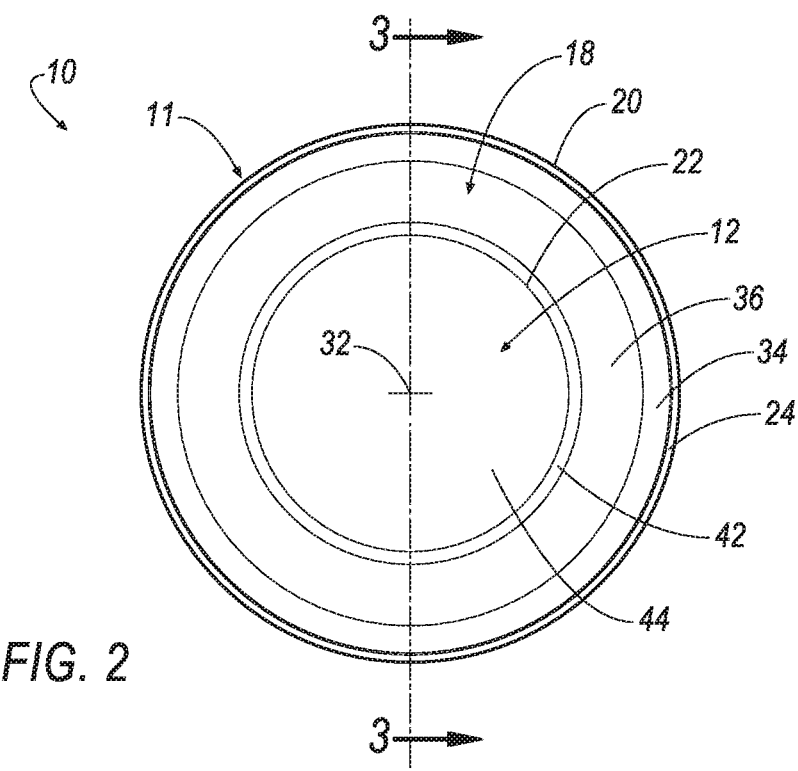
FIG. 2 is a top view of the round ceramic cutting insert illustrated in FIG. 1.

FIGS. 1-5 shows an indexable, ceramic cutting insert 10 in accordance with one aspect of the invention. The cutting insert 10 includes a body 11 made of a ceramic material and having a first or top surface 12, a second or bottom surface 14 and a generally circular flank surface 16 that extends between the first or top surface 12 and the second or bottom surface 14. Thus, it will be appreciated that the cutting insert 10 is a generally round cutting insert for positioning in a tool body for performing a cutting operation on a workpiece (not shown) as will be described in more detail herein. It will also be appreciated that the first or top surface 12 and the second or bottom surface 14 are identical to each other. Thus, only the first or top surface 12 of the cutting insert will be discussed below for brevity.

Preferably, the ceramic cutting insert 10 is selected from the group of alumina based ceramics, silicon nitride based ceramics and SiALON based ceramics. Preferably, the ceramic composition has dispersed therein a reinforcing agent selected from the group of ceramic whiskers (e.g. titanium carbide and/or silicon carbide), ceramic particulate (e.g. zirconia, Hafnia, silicon carbide and/or titanium carbide) and their mixtures. In addition, the ceramic composition also preferably has a residue of a sintering aid dispersed therein. The sintering aid is preferably selected from the group of zirconia, alumina, aluminum nitride, yttria, ytterbia, lanthana, magnesia and their mixtures with each other or with other elements. A preferred ceramic composition comprises about 90-100% silicon nitride or sialon phases, rare earth oxide addition added in an amount of zero to 15 weight percent, all distributed in an silicon nitride or sialon matrix. More preferably, this composition has 4 to 12 weight percent of aluminum nitride, 5-12% Ytterbia 2-10 wt %. The ceramic materials that are useful in the invention are those having a transverse rupture strength of at least 80 ksi and a fracture toughness of at least 5 $MPam_{1/4}$. Preferably, the transverse rupture strength is at least 100 ksi, more preferably at least 130 ksi, and most preferably at least 140 ksi. Please see K-01688 or U.S. Pat. No. 6,693,054, 2004 by Yeckley if you need more information. This is just one example of sialon, but very relevant to this invention.

As shown in FIGS. 1-4, the first or top surface 12 of the cutting insert 10 includes a chip forming feature, shown generally at 18, that extends in a generally radially outwardly direction to a cutting edge 20 and extends in a generally radially inwardly direction to an inner edge 22.

Figure 3:
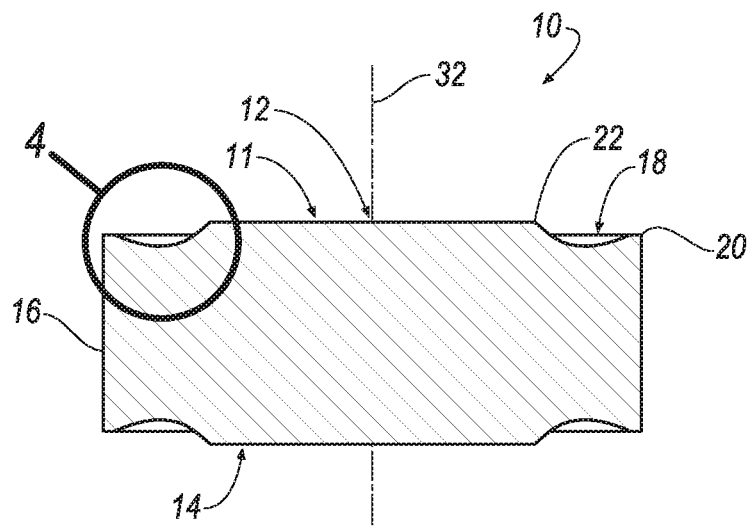
FIG. 3 is a cross-sectional view of the round ceramic cutting insert taken along line 3-3 of FIG. 2.
Figure 4:
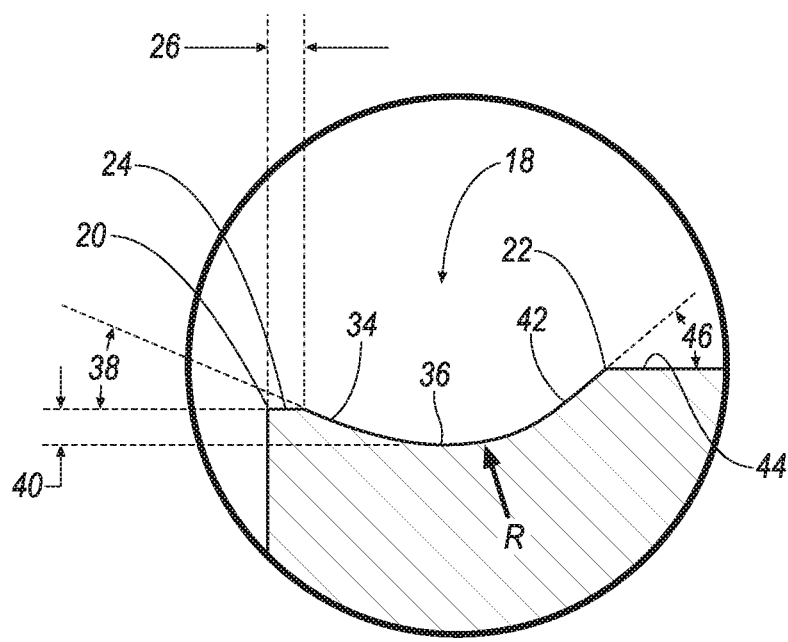
FIG. 4 is an enlarged view of the chip forming feature of the ceramic cutting insert with an optional land surface formed at a zero angle with respect to a central, longitudinal axis of the cutting insert.
Figure 5:
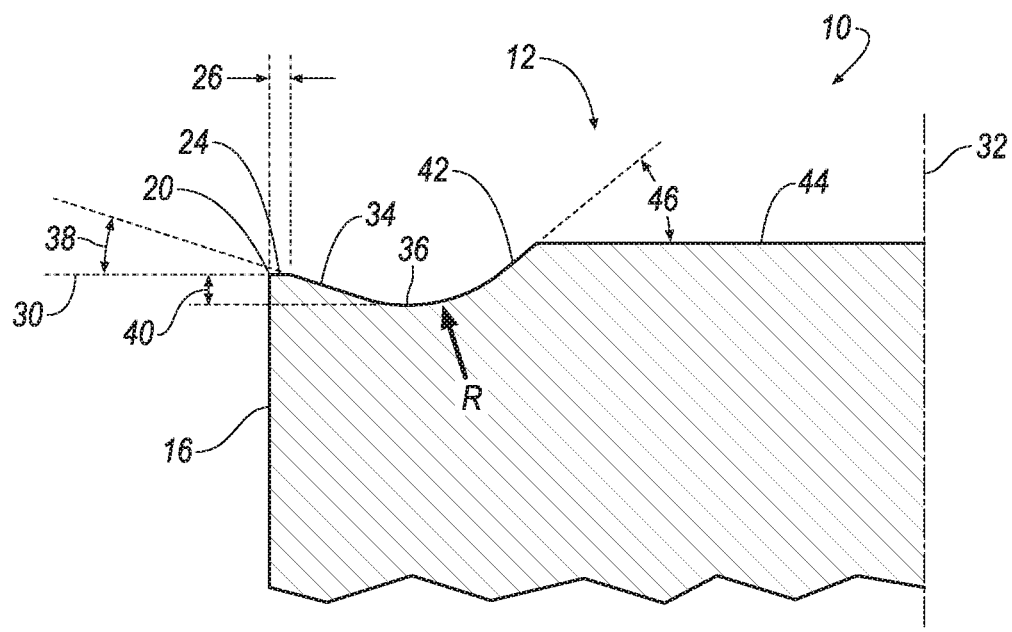
FIG. 5 is an enlarged view of the chip forming feature with an optional land surface formed at a negative angle with respect to a plane that is perpendicular to a central, longitudinal axis of the cutting insert.

Referring now to FIGS. 3 and 4, one aspect of the invention is that the chip forming feature 18 includes an optional land surface 24 adjacent the cutting edge 20 having a width 26 of between about 0.0 to about 0.2 inches (0.508 mm). Referring to FIGS. 4 and 5, the land surface 24 can be formed at an angle 28 of between about 0.0 degrees to about −25.0 degrees with respect to a plane 30 that is substantially perpendicular to a central, longitudinal axis 32 of the cutting insert 10.

Referring now to FIG. 4, the chip forming feature 18 further includes a front wall 34 that slopes downward from the optional land surface 24 (or from the cutting edge 20 in the case in which the land surface 24 is omitted) radially inward toward a rounded bottom surface 36. The front wall 34 slopes downward at a rake angle 38 of between about ten (10) degrees and about twenty-five (25) degrees with respect to the plane 30 that is substantially perpendicular to the central, longitudinal axis 32 of the cutting insert 10. The rounded bottom surface 36 is formed with a radius, R, of between about 0.02 inches (0.508 mm) to about 0.08 inches (2.032 mm). The rounded bottom surface 36 has a depth 40 of between about 0.006 inches (0.1524 mm) to about 0.025 inches (0.635 mm) with respect to the cutting edge 20 of the cutting insert 10.

The chip forming feature 18 also includes a back wall 42 that that slopes upward from the rounded bottom surface 36 radially inward to the inner edge 22. It is noted that the inner edge 22 is at the intersection of the back wall 42 and a central, substantially planar plateau 44. The back wall 42 slopes upward at an angle 46 of between about thirty (30) degrees and about fifty (50) degrees with respect to the plane 30 that is substantially perpendicular to the central, longitudinal axis 32 of the cutting insert 10. The central plateau 44 acts as a seating surface for the cutting insert 10 when mounting the cutting insert 10 in a cutting tool (not shown).

Figure 6:
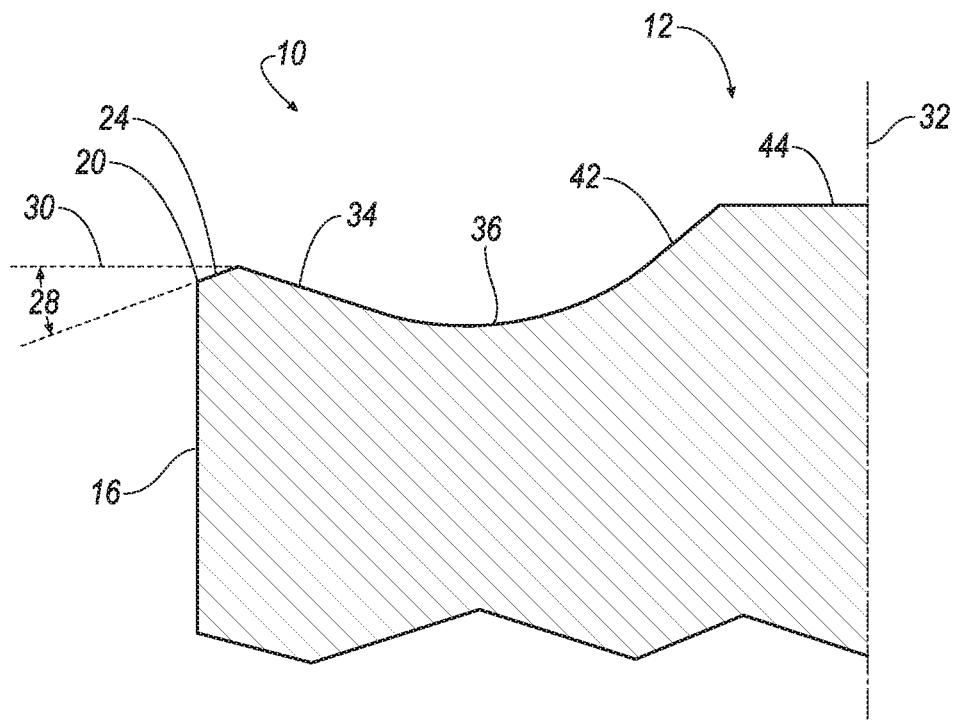
FIG. 6 is a perspective view of a square or polygonal ceramic cutting insert with the chip forming feature according to the invention.
Figure 7:
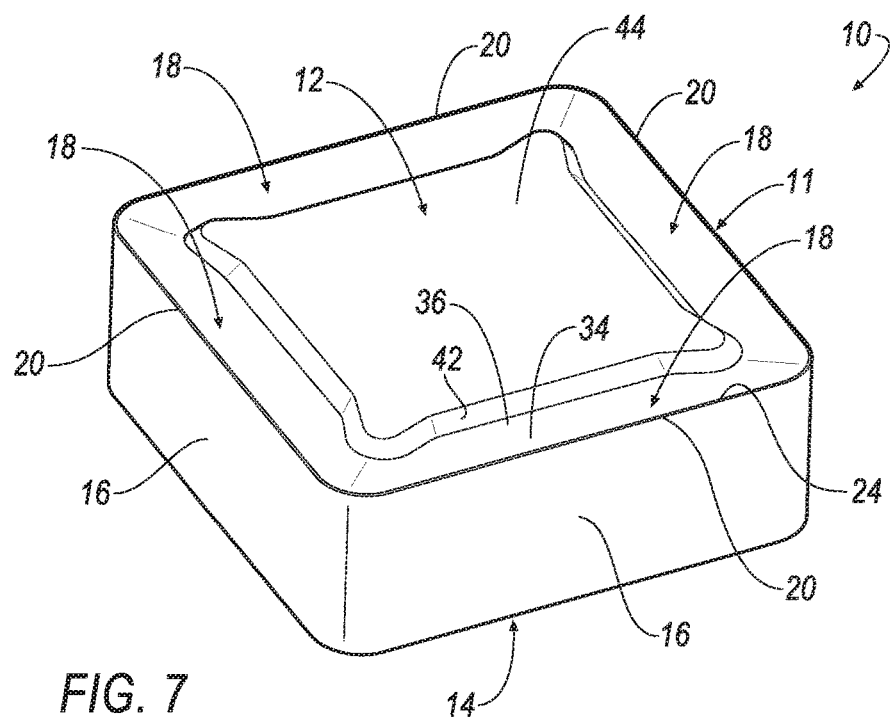
FIG. 7 is a top view of the square ceramic cutting insert illustrated in FIG. 6.

A round, ceramic cutting insert 10 with the chip forming feature 18 is shown and described in FIGS. 1-5. However, it will be appreciated that the invention is not limited by the shape of the cutting insert 10, and that the principles of the chip forming feature 18 of the invention can be applied to cutting inserts having any desirable shape. For example, the principles of the chip forming feature 18 of the invention can be applied to a square-shaped cutting insert 10 having top and bottom surfaces 12, 14 and a plurality of flank surfaces 16, as shown in FIGS. 6 and 7. Other shapes, such as triangular, trigon, rectangular, and any polygonal-shaped cutting insert are contemplated are within the scope of the invention.

Figure 8:
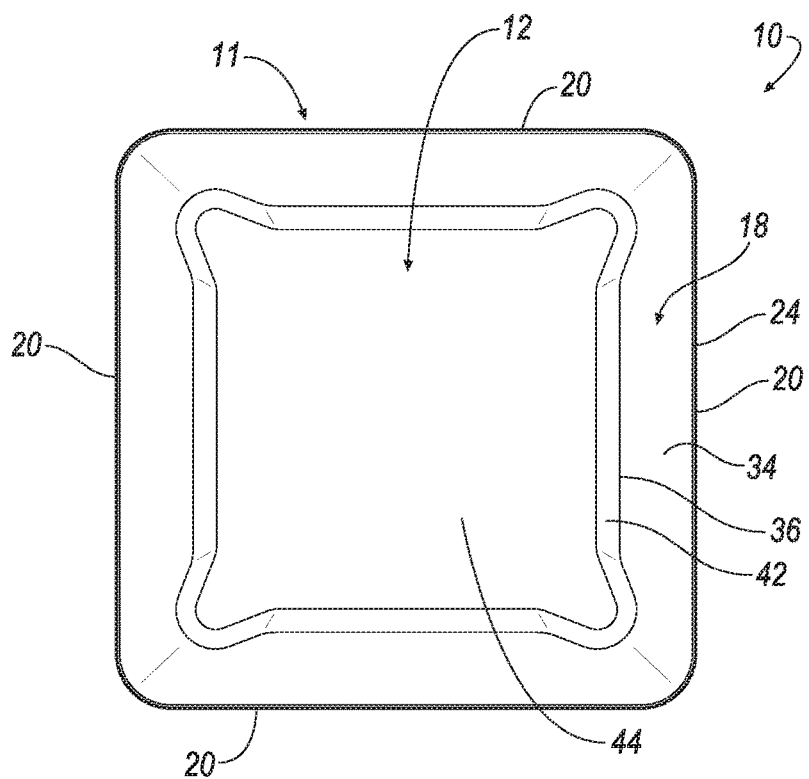
FIG. 8 is diagram of a method of manufacturing the ceramic cutting insert with the chip forming feature.
Figure 9:
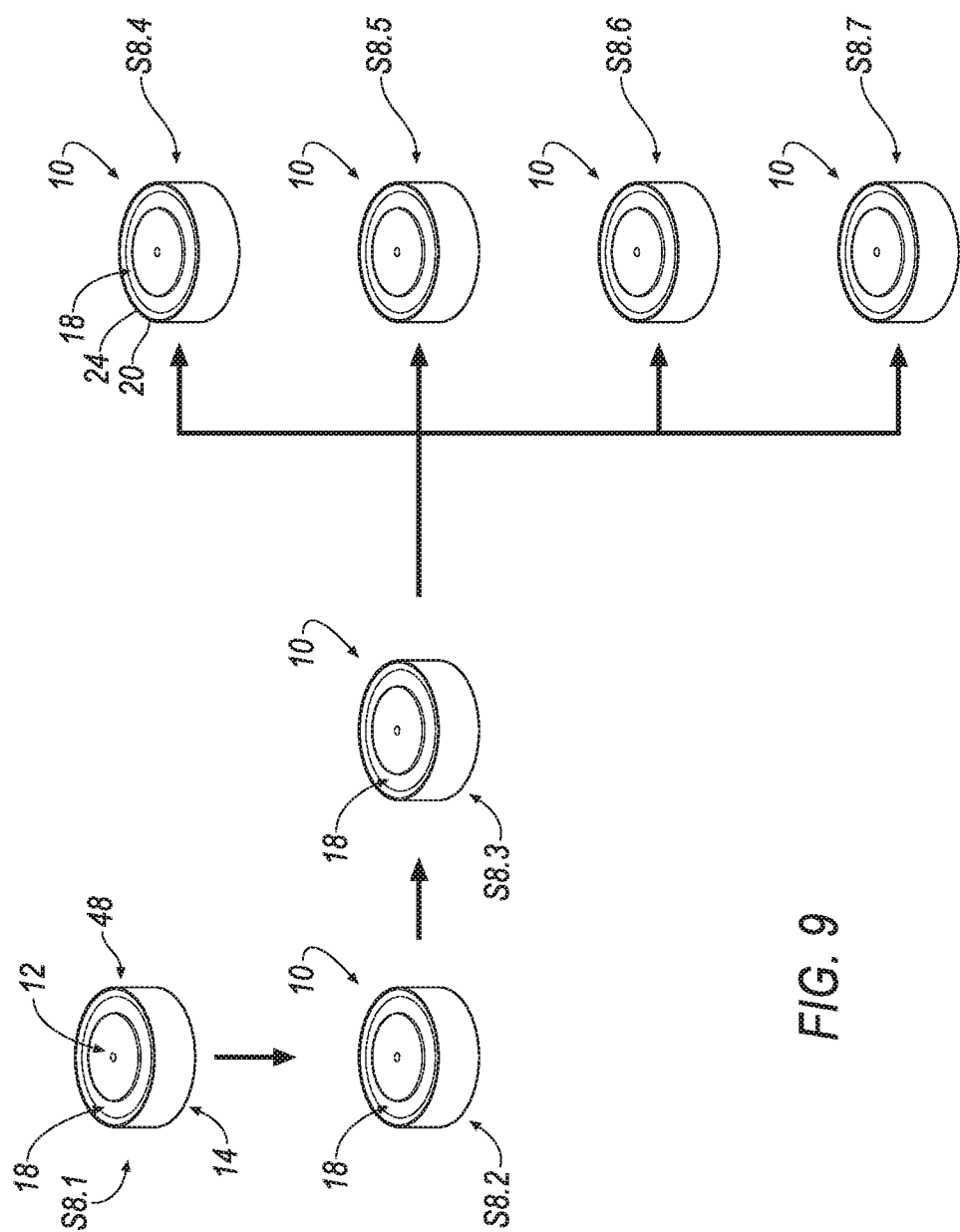

Referring now to FIG. 8, a method of manufacturing the cutting insert 10 shown in FIGS. 1-7 will now be described. It is noted that the round ceramic cutting insert 10 is shown in FIG. 8, but it should be appreciated that the method of the invention can be applied to the square ceramic cutting insert 10 shown in FIGS. 6 and 7, and any polygonal-shaped cutting insert. In step S8.1, a blank 48 made of ceramic material is pressed into the desired shape (i.e. round, square, polygonal, and the like) with the chip forming feature 18 on the top surface 12, the bottom surface 14, or both. The blank 48 is typically is pressed at a pressure of between about 2 ksi and about 20 ksi.

Next, the blank 48 is sintered in Step S8.2 at a temperature of between about 1500° C. and about 2000° C. to produce the body 11 of the cutting insert 10. Then, the cutting insert 10 is ground in Step S8.3 to within a dimensional tolerance of about 0.005 inches (0.127 mm).

Then, the cutting insert 10 can be subjected to several optional finishing steps. For example, the land surface 24 can be formed between the chip forming feature 18 and the cutting edge 20 in Step S8.4. The land surface 24 can be formed by using, for example, a computer numerical controlled (CNC) procedure of a type known in the art. In another finishing step, the cutting insert 10 can be brushed and honed in Step S8.5. In yet another finishing step, the cutting insert 10 can be coated in Step S8.6. Typically, the cutting insert 10 can be coated with a wear-resistant material, such as silicon nitride on sailon. In still yet another finishing step, the cutting insert 10 can be wet blast honed to the desired finish in Step S8.7.

A test was conducted by mounting the round ceramic insert 10 into a face mill with a 50.8 mm cutting diameter. The workpiece was IN718 with a length of 10 inches. The cutting parameters were: cutting speed of 747 m/min, a feed rate of 0.051 mm/tooth, depth of cut of 1.5 mm and a radial depth of cut of 30 mm. The results from the test indicated that the ceramic cutting insert 10 with the chip forming feature 18 described herein provides superior performance with very good chip removal. The spindle loads was decreased compared to a standard flat top ceramic insert with the chip feature of the invention.

In view of the foregoing, it has now been discovered that both one-sided and two-sided ceramic cutting inserts with the chip forming feature of the invention are useful in the high speed machining of soft steels, ductile irons and high temperature alloys. In addition, the applicants have also surprisingly discovered that, while these configurations may be produced and used in a ground condition, as molded flank faces and as molded chip forming features (e.g., lands and/or grooves) can also preferably be successfully made and utilized, thereby significantly reducing the manufacturing cost of such designs. Further, the applicants have surprisingly discovered that the cutting insert of the invention lowers tool pressure, reduces cutting forces and spindle load on the machine, reduces machine demand, provides quieter operation, while allowing the cutting insert to take on higher chip loads and deeper depths of cut.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting insert comprising a polygonal body made of a ceramic material, the polygonal body having a first surface, a second surface and at least one flank surface extending between the first surface and the second surface, the first surface including a chip forming feature extending in a radially outwardly direction to a cutting edge and extending in a radially inwardly direction to an inner edge, the chip forming feature including a linear front wall that slopes downward from the cutting edge radially inward toward a rounded bottom surface, and a linear back wall that slopes upward from the rounded bottom surface radially inward to the inner edge, wherein the rounded bottom surface intersects each of the linear front wall and linear back wall.

2. The cutting insert according to claim 1, wherein the front wall slopes downward at a rake angle of between about ten degrees and about twenty-five degrees with respect to a plane that is substantially perpendicular to a central, longitudinal axis of the cutting insert.

3. The cutting insert according to claim 2, wherein the back wall slopes upward at an angle of between about thirty degrees and about fifty degrees with respect to a plane that is substantially perpendicular to a central, longitudinal axis of the cutting insert.

4. The cutting insert according to claim 1, wherein the rounded bottom surface is formed with a radius, R, of between about 0.02 inches (5.08 mm) to about 0.08 inches (2.032 mm) and a depth of between about 0.006 inches (0.1524 mm) to about 0.025 inches (0.635 mm) with respect to the cutting edge of the cutting insert.

5. The cutting insert according to claim 1, wherein the inner edge is formed at an intersection between the back wall and a central plateau that acts as a seating surface for the cutting insert.

6. The cutting insert of claim 5, wherein the central plateau is higher than the cutting edge.

7. The cutting insert of claim 1, wherein the inner edge is formed at an intersection between the linear back wall and a central plateau that acts as a seating surface for the cutting insert, the inner edge having a fixed distance from the cutting edge along a circumference of the polygonal body.

8. The cutting insert of claim 7, wherein the plateau is of uniform height.

9. A cutting insert comprising a polygonal body made of a ceramic material, the polygonal body having a first surface, a second surface and at least one flank surface extending between the first surface and the second surface, the first surface including a chip forming feature extending in a radially outwardly direction to a cutting edge and extending in a radially inwardly direction to an inner edge, the chip forming feature including a land surface extending between the cutting edge and a linear front wall that slopes downward from the land surface radially inward toward a rounded bottom surface, and a linear back wall that slopes upward from the rounded bottom surface radially inward to the inner edge, wherein the rounded bottom surface intersects each of the linear front wall and linear back wall.

10. The cutting insert according to claim 9, wherein the land surface has a width of between 0.0 to about 0.2 inches (5.08 mm) and is formed at an angle of between 0.0 degrees to 25.0 degrees with respect to a plane that is perpendicular to a central, longitudinal axis of the cutting insert.

11. The cutting insert according to claim 9, wherein the front wall slopes downward at a rake angle of between about ten degrees and about twenty-five degrees with respect to a plane that is substantially perpendicular to a central, longitudinal axis of the cutting insert.

12. The cutting insert according to claim 9, wherein the rounded bottom surface is formed with a radius, R, of between about 0.02 inches (5.08 mm) to about 0.08 inches (2.032 mm) and a depth of between about 0.006 inches (0.1524 mm) to about 0.025 inches (0.635 mm) with respect to the cutting edge of the cutting insert.

13. The cutting insert according to claim 9, wherein the back wall slopes upward at an angle of between about thirty degrees and about fifty degrees with respect to a plane that is substantially perpendicular to a central, longitudinal axis of the cutting insert.

14. The cutting insert according to claim 9, wherein the inner edge is formed at an intersection between the back wall and a central plateau that acts as a seating surface for the cutting insert.

15. The cutting insert of claim 14, wherein the central plateau is higher than the land surface.

* * * * *